United States Patent
Kurt et al.

(10) Patent No.: US 10,207,704 B2
(45) Date of Patent: *Feb. 19, 2019

(54) METHOD FOR AUTONOMOUSLY PARKING AND UN-PARKING A MOTOR VEHICLE

(71) Applicants: Dura Operating, LLC, Auburn Hills, MI (US); Ohio State Innovation Foundation, Columbus, OH (US)

(72) Inventors: Arda Kurt, Dublin, OH (US); Umit Ozguner, Dublin, OH (US); Gordon Thomas, Beverly Hills, MI (US); Keith Redmill, Columbus, OH (US)

(73) Assignee: DURA OPERATING, LLC, Auburn Hills, MI (US)

(*) Notice: Subject to any disclaimer, the term of this patent is extended or adjusted under 35 U.S.C. 154(b) by 251 days.

This patent is subject to a terminal disclaimer.

(21) Appl. No.: 15/242,166

(22) Filed: Aug. 19, 2016

(65) Prior Publication Data

US 2018/0050690 A1 Feb. 22, 2018

(51) Int. Cl.
*B60W 30/06* (2006.01)
*G05D 1/00* (2006.01)
(Continued)

(52) U.S. Cl.
CPC .......... *B60W 30/06* (2013.01); *B62D 15/0285* (2013.01); *G01C 21/34* (2013.01);
(Continued)

(58) Field of Classification Search
CPC ... B60W 30/06; G01C 21/3453; G01C 22/00; B62D 15/0285; B62D 1/28; B63D 1/28; G05D 1/02
See application file for complete search history.

(56) References Cited

U.S. PATENT DOCUMENTS 5,764,015 A * 6/1998 Shimizu .................. B62D 1/28
180/204
7,844,377 B2 11/2010 Oota et al.
(Continued)

FOREIGN PATENT DOCUMENTS

| EP | 1499522 B1 | 12/2009 |
|----|------------|---------|
| WO | 2008032354 A1 | 3/2008 |
| WO | 2016066355 A1 | 5/2016 |

OTHER PUBLICATIONS

Marcos Comes Prado, "Planejamento de trajetoria para esticionamento de veiculos automonos", Dissertation, Apr. 1, 2013, pp. 1-84.
(Continued)

*Primary Examiner* — Yuri Kan
(74) *Attorney, Agent, or Firm* — Robert E. Ford; Raymond J. Vivacqua; Steven L. Crane

(57) ABSTRACT

A method for autonomously parking or un-parking a motor vehicle includes the steps of locating the motor vehicle within a parking area, setting a destination location within the parking area, generating and setting a path from the location of the motor vehicle to the destination location, and autonomously driving the motor vehicle along the path. The path is generated by (a) generating a first set of nodes from the location of the motor vehicle, (b) assigning a cost to each node in the first set of nodes, (c) selecting a lowest cost node from the first set of nodes, (d) generating another set of nodes from the selected node, (e) assigning a cost to each of the newly generated nodes, (f) selecting a lowest cost node from all of the nodes, and (g) repeating steps (d)-(f) until a lowest cost node is located at the destination location.

20 Claims, 3 Drawing Sheets

FIG. 1

(51) Int. Cl.
  *G01C 22/00* (2006.01)
  *G05D 1/02* (2006.01)
  *B62D 1/28* (2006.01)
  *B62D 15/02* (2006.01)
  *G01C 21/34* (2006.01)

(52) U.S. Cl.
  CPC ......... *G05D 1/0088* (2013.01); *G05D 1/0212* (2013.01); *B60W 2550/10* (2013.01); *B60W 2710/18* (2013.01); *B60W 2720/10* (2013.01)

(56) References Cited

U.S. PATENT DOCUMENTS

| | | | |
|---|---|---|---|
| 7,969,558 | B2 | 6/2011 | Hall |
| 8,675,181 | B2 | 3/2014 | Hall |
| 8,767,190 | B2 | 7/2014 | Hall |
| 9,194,168 | B1 | 11/2015 | Lu et al. |
| 9,896,091 | B1* | 2/2018 | Kurt ............... B60W 30/06 |
| 10,012,986 | B2* | 7/2018 | Kurt ............... G01C 21/3453 |
| 2006/0212216 | A1 | 9/2006 | Kobayashi et al. |
| 2010/0020306 | A1 | 1/2010 | Hall |
| 2011/0216304 | A1 | 9/2011 | Hall |
| 2012/0101654 | A1 | 4/2012 | Samples et al. |
| 2013/0231824 | A1 | 9/2013 | Wilson et al. |
| 2014/0032031 | A1* | 1/2014 | Okamura ........... B62D 15/0285 701/23 |
| 2015/0073645 | A1 | 3/2015 | Davidsson et al. |
| 2015/0185734 | A1 | 7/2015 | Minoiu-Enache |
| 2016/0153796 | A1 | 6/2016 | Stankoulov |
| 2016/0200359 | A1 | 7/2016 | Boeck et al. |
| 2018/0052459 | A1* | 2/2018 | Kurt ................... G01C 21/3453 |

OTHER PUBLICATIONS

Christian Loeper et al., "Automated valted parking as part of an integrated travel assistance", Proceedings for the 16th International IEEE Annual Conference on Intelligent Transportation Systems (ITSC 2013), Oct. 6, 2013, pp. 2341-2348.

Maxim Likhachev et al., "Planning long dynamically feasible maneuvers for automomous vehicles", The International Journal of Robotics Research, Aug. 1, 2009, pp. 933-945.

Stephan Rottmann et al., "Demo: Automated valet parking and charging", 2014 IEEE Vehicular Networking Conference (VNC), Dec. 3, 2014, pp. 203-204.

* cited by examiner

METHOD FOR AUTONOMOUSLY PARKING AND UN-PARKING A MOTOR VEHICLE

FIELD

The invention relates generally to autonomous driver assistance systems for motor vehicles, and more particularly to autonomous driver assistance systems for parking and un-parking or retrieving a motor vehicle.

BACKGROUND

The statements in this section merely provide background information related to the present disclosure and may or may not constitute prior art.

Smart car technologies such as free-ranging on grid navigation, as well as parking guidance and information systems, aid in the prevention of human error when drivers operate a vehicle. Such technologies have been used to improve navigation of roadways, and to augment the parking abilities of motor vehicle drivers while the drivers are present within the motor vehicle. For example, rear view camera systems and impact alert systems have been developed to assist the operator of the motor vehicle while parking to avoid collisions. In addition, autonomous parking systems have been developed that autonomously park the motor vehicle in a parallel parking spot once the operator of the motor vehicle has positioned the motor vehicle in a predefined location proximate the parking spot.

While these systems are useful for their intended purpose, they require that the operator of the motor vehicle locate the parking spot and drive to the parking spot. Thus, there is a need in the art for improved smart car technologies that utilize preexisting infrastructure to autonomously park a motor vehicle. Moreover, there is a need to implement automatic parking systems in motor vehicles that do not increase cost, and which also increase the accuracy and robustness of parking systems while providing additional redundant ease of access and safety features.

SUMMARY

A method for autonomously parking or un-parking a motor vehicle is provided. The method includes the steps of locating the motor vehicle within a parking area, setting a destination location within the parking area, generating and setting a path from the location of the motor vehicle to the destination location, and autonomously driving the motor vehicle along the path from the location of the motor vehicle to the destination location. The path is generated by (a) generating a first set of nodes from the location of the motor vehicle, (b) assigning a cost to each node in the first set of nodes, (c) selecting a lowest cost node from the first set of nodes, (d) generating another set of nodes from the selected node, (e) assigning a cost to each of the newly generated nodes, (f) selecting a lowest cost node from all of the nodes, and (g) repeating steps (d)-(f) until a lowest cost node is located at the destination location.

In one aspect, generating the first set of nodes includes generating a plurality of nodes each a fixed distance from the location of the motor vehicle and each at a different steering angle.

In another aspect, generating the another set of nodes includes generating a plurality of nodes each the fixed distance from the selected node of the first set of nodes and each at one of the different steering angles.

In another aspect, the fixed distance is approximately 2 meters.

In another aspect, generating the first set of nodes and the another set of nodes includes generating a set of forward nodes in front of the motor vehicle and a set of reverse nodes behind the motor vehicle.

In another aspect, the set of forward nodes includes a node straight ahead of the motor vehicle, four nodes to the right of the motor vehicle, and four nodes to the left of the motor vehicle.

In another aspect, assigning a cost to each of the newly generated nodes includes adding a base cost to the cost from the selected node from which the newly generated nodes are generated.

In another aspect, assigning a cost to each of the newly generated nodes further includes adding a turning cost to the base cost, wherein a value of the turning cost increases with an increase in the steering angle.

In another aspect, assigning a cost to each of the newly generated nodes further includes adding a reverse cost to the base cost if the newly generated node is behind the motor vehicle.

In another aspect, the base cost of a newly generated node is a function of the distance of the newly generated node from the destination location.

In another aspect, generating a path further comprises a step of determining whether a newly generated node would be in an allowed area of the parking map or in an obstructed area of the parking map, and wherein any nodes in obstructed areas are not generated.

In another aspect, generating a path further includes a step of determining whether a newly generated node has been previously generated and wherein any new nodes that have been previously generated are not generated again.

Further aspects, examples, and advantages will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way. The components in the figures are not necessarily to scale, emphasis instead being placed upon illustrating the principles of the invention. Moreover, in the figures, like reference numerals designate corresponding parts throughout the views.

DETAILED DESCRIPTION

The following description is merely exemplary in nature and is not intended to limit the present disclosure, application or uses.

Figure 1:
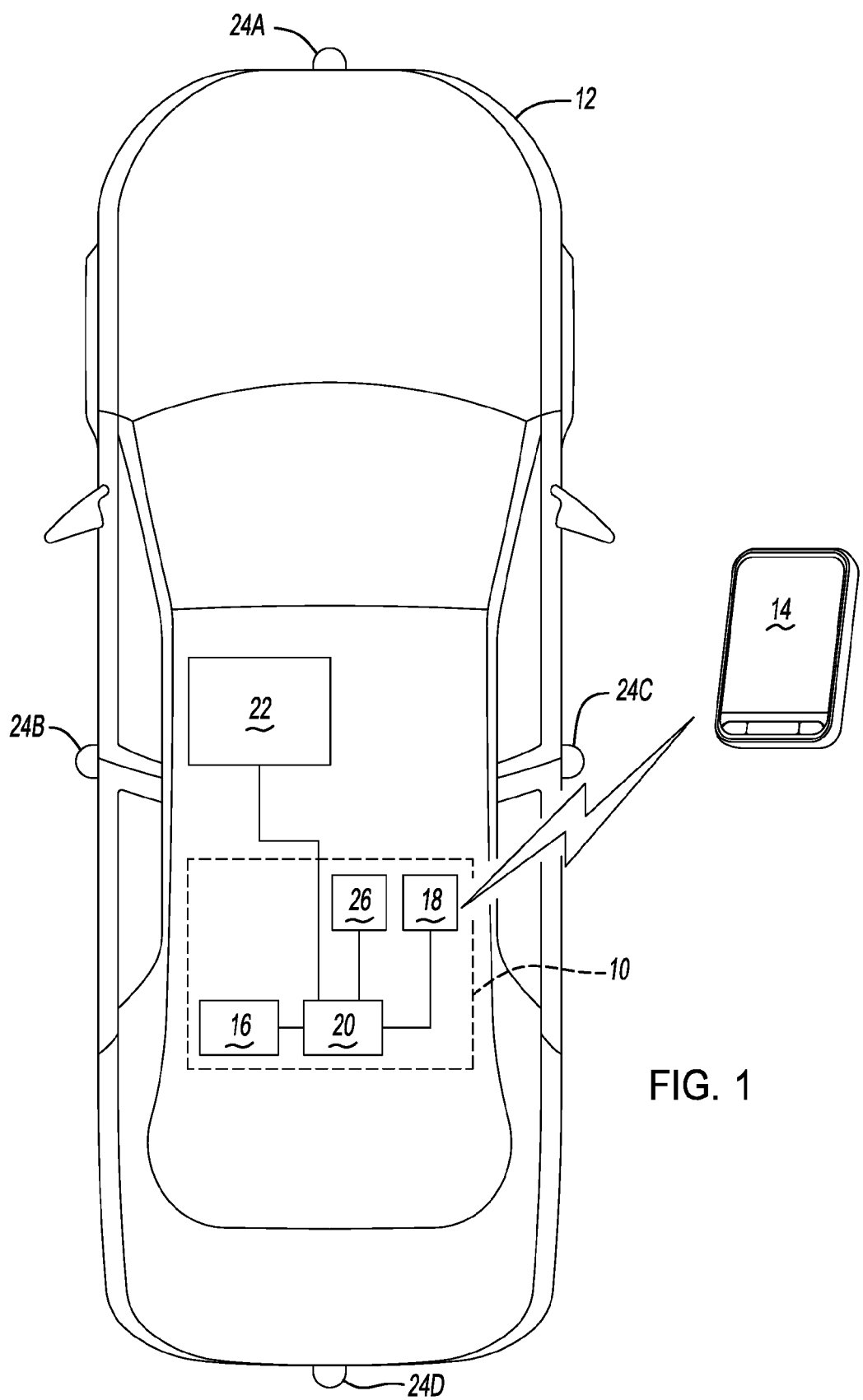
FIG. 1 is a schematic diagram of an exemplary motor vehicle having an automatic valet system according to the principles of the present disclosure.

With reference to FIG. 1, an autonomous valet system according to the principles of the present disclosure is indicated by reference number 10. The autonomous valet system 10 is used with an exemplary motor vehicle 12 and an exemplary mobile device 14. The motor vehicle 12 is illustrated as a passenger vehicle, however, the motor vehicle 12 may be a truck, sport utility vehicle, van, motor home, or any other type of vehicle without departing from the scope of the present disclosure. The mobile device 14 is preferably a mobile phone, however, the mobile device 14 may be a mobile computer, laptop, tablet, smart watch, or any other device in wireless communication with the motor vehicle 12. The autonomous valet system 10 runs an autonomous valet method or application, as will be described in greater detail below.

The autonomous valet system 10 is operable to autonomously park and un-park the motor vehicle 12. The autonomous valet system 10 may have various configurations without departing from the scope of the present disclosure but generally includes a sensor sub-system 16 and a communication sub-system 18 each in communication with a controller 20. The controller 20 communicates with a vehicle control system 22. The sensor sub-system 16 includes a plurality of sensors 24A-D mounted along the periphery of the motor vehicle 12. In the example provided, the sensors 24A-D are located at the front, left, right, and rear of the motor vehicle 12, respectively, to provide 360 degrees of overlapping coverage. However, it should be appreciated that the sensor sub-system 16 may have any number of sensors 24 without departing from the scope of the disclosure. Each of the sensors 24A-D is operable to collect or sense information in a predefined area surrounding the motor vehicle 12. Information from the sensors 24A-D is communicated to the controller 20. In a preferred embodiment, the sensors 24A-D are Light Detection and Ranging (LiDAR) sensors. However, the sensors 24A-D may be cameras, radar or sonar sensors, or any other type of proximity sensors. The communication sub-system 18 includes a receiver/transmitter operable to receive and/or transmit wireless data to the mobile device 14. The wireless data is communicated to the controller 20. In addition, the communication sub-system 18 may communicate with other vehicles (vehicle-to-vehicle communication), infrastructure such as a parking lot (vehicle-to-infrastructure), and may receive GPS data.

The controller 20 is a non-generalized, electronic control device having a preprogrammed digital computer or processor, memory or non-transitory computer readable medium used to store data such as control logic, instructions, image data, lookup tables, etc., and a plurality of input/output peripherals or ports. The processor is configured to execute the control logic or instructions. The controller 20 may have additional processors or additional integrated circuits in communication with the processor, such as perception logic circuits for analyzing the sensor data.

The controller 20 may optionally communicate with a human machine interface (HMI) 26. The HMI 26 is disposed within the cabin of the motor vehicle 12 and is preferably a touch screen accessible by an operator of the motor vehicle 12. However, the HMI 26 may be any haptic, verbal, or gesture control system without departing from the scope of the present disclosure. The HMI 26 may be used to activate and control the autonomous valet system 10. Additionally, the mobile device 14 may be used to activate and control the autonomous valet system 10.

The vehicle control system 22 includes any systems that implement the autonomous valet functions which include parking and un-parking the motor vehicle 12. For example, the vehicle control system 22 may include a braking control system, throttle control system, steering control system, body control system, etc. The vehicle control system 22 may also include any advanced driver assistance system (ADAS) functions that automate, adapt, or enhance vehicle systems in order to increase vehicle safety and/or operator driving performance. For example, the vehicle control system 22 may include ADAS technologies that alert the driver to potential problems or to avoid collisions by implementing safeguards, such as autonomously controlling the motor vehicle 12. The vehicle control system 22 may also include ADAS features that enhance certain systems, such as automated lighting, adaptive cruise control, automated braking, or improved blind spot elimination using camera technology. Finally, it should be appreciated that the vehicle control system 22 may be part of the autonomous valet system 10 without departing from the scope of the present disclosure.

Figure 2:
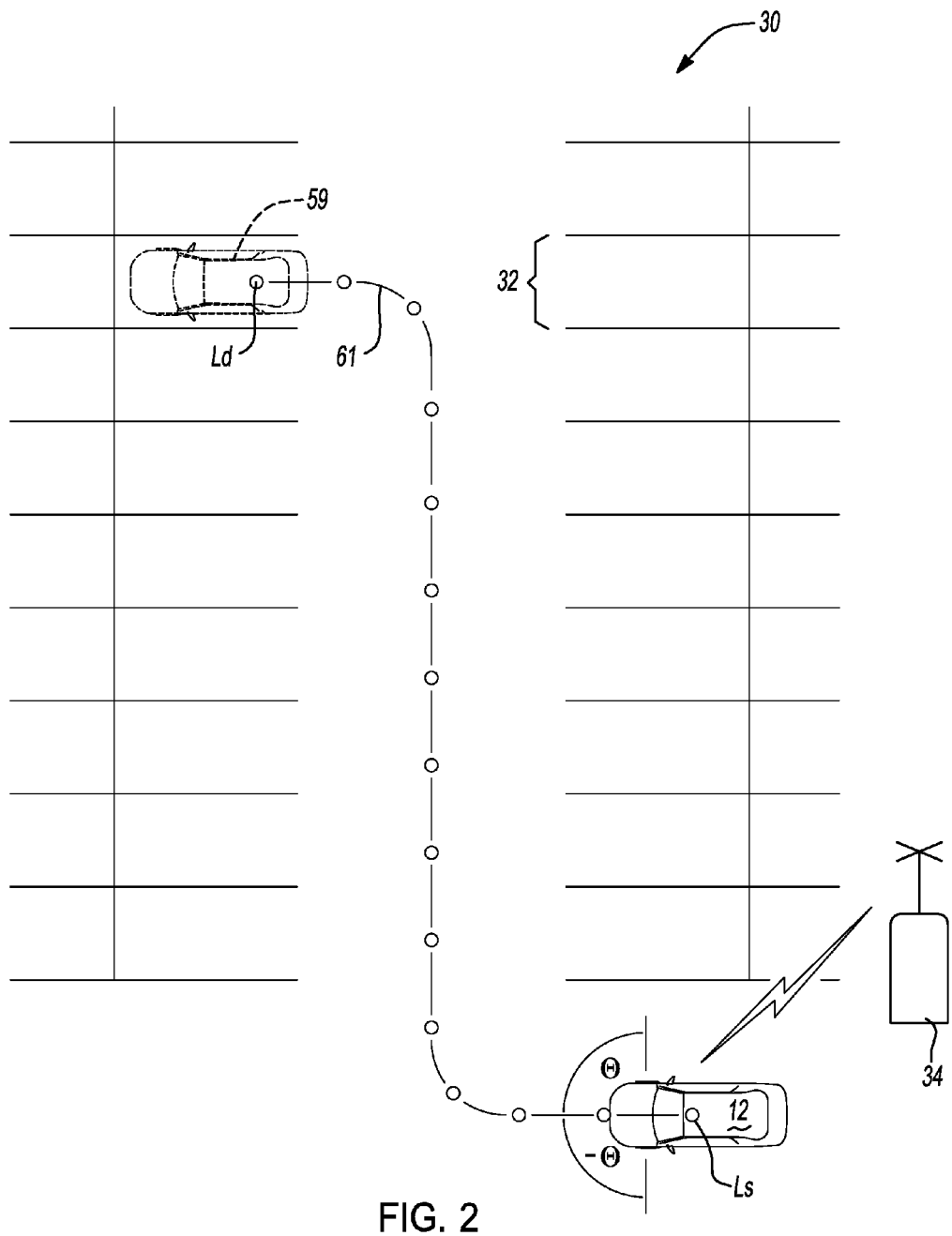
FIG. 2 is a schematic diagram of an exemplary parking area.

Turning to FIG. 2, an exemplary parking area is indicated by reference number 30. The parking area 30 includes a plurality of parking spots 32. It should be appreciated that the parking area 30 may have any configuration, may be a parking structure, and may have any number of parking spots 32 without departing from the scope of the present disclosure. The parking area 30 includes a parking area infrastructure 34 that may communicate with the motor vehicle 12.

Figure 3:
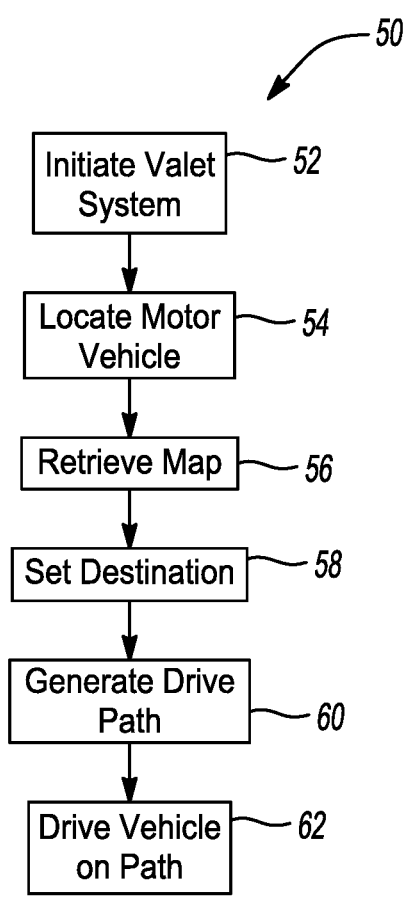
FIG. 3 is a flow chart depicting a method for autonomously parking and un-parking the motor vehicle according to the principles of the present disclosure.

With reference to FIG. 3, and continued reference to FIGS. 1 and 2, a method for autonomously parking and un-parking the motor vehicle 12 in the parking area 30 is indicated by reference number 50. By way of example, the method 50 illustrates parking the motor vehicle 12 within the parking area 30. However, it should be appreciated that the method 50 may be used identically when un-parking or retrieving the motor vehicle 12 from the parking area 30. The method 50 begins at step 52 where an operator of the motor vehicle 12 initiates or activates the autonomous valet system 10 using either the HMI 26 or the mobile device 14. For example, when parking, the operator may use the HMI 26 while during un-parking the operator may use the mobile device 14.

At step 54, the motor vehicle 12 is located within, or relative to, the parking area 30. The motor vehicle 12 may be located in the parking area 30 by positioning the motor vehicle 12 in a predefined starting location or parking spot or by GPS coordinates. At step 56 the motor vehicle 12 communicates with the parking area infrastructure to receive a map of the parking area 30. The map may be defined as a Cartesian coordinate system with x and y coordinates. The motor vehicle 12 is located on the map using $(x,y,\theta)$ coordinates, where $\theta$ is a steering angle or a heading of the motor vehicle 12. At step 58, a destination is set in the parking area 30. In the example provided, the destination is a parking spot indicated by reference number 59 in FIG. 2. The destination may be selected by an operator of the motor vehicle 12 or may be assigned by the parking area infrastructure 34 based on open or available parking spots 32. Alternatively, in an un-park mode, the destination location may be the location of the mobile device 14. It should be appreciated that steps 54-58 may be done in various orders or simultaneously without departing from the scope of the present disclosure.

Next, at step 60, a node tree path planner is generated from the location of the motor vehicle 12 to the destination location 59. From the node tree path planner a lowest cost path is selected, as shown by reference number 61 in FIG. 2. The lowest cost path 61 operates as a path for the motor vehicle 12 to take from the starting location to the destination location 59. Finally, at step 62, the autonomous valet system 10 drives the mover vehicle along the lowest cost path 61 using the vehicle control system 22. The sensor sub-system 16 may be used during autonomous driving to avoid obstacles not located in the predefined parking area map, such as pedestrians, other vehicles, etc.

Figure 4:
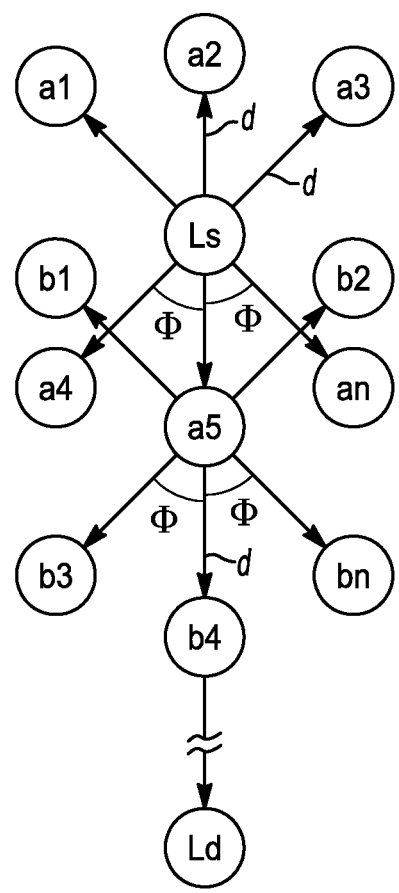
FIG. 4 is an example of a node tree used in the method for autonomously parking and un-parking the motor vehicle.

Turning now to FIG. 4, the method of generating the node tree path planner will now be described in greater detail. The node tree path planner begins by generating a first set of nodes $a_1, a_2, a_3, a_4, a_5 \ldots a_n$ from the starting location $L_s$ of the motor vehicle 12. Each node is generated a distance 'd' from the starting location $L_s$ at a predefined turn angle $\phi$. It should be appreciated that any number of nodes may be generated however, in a preferred embodiment, nine forward nodes are generated and nine reverse nodes are generated. The distance d may have various values but is preferably approximately 2 meters. The turn angle $\phi$ may also have various values but preferably equally divides the nodes from straight ahead to a full right turn and a full left turn. Each of the nodes is defined by $(x,y,\theta)$ coordinates. Next, any nodes that are blocked by the parking area map are removed or not generated.

Once the first set of nodes are generated, the node tree path planner assigns a cost to each of the nodes. The cost for each node in the first set is equal to a base cost plus a turning cost. The base cost is a function of the distance from the node to the destination location $L_d$. Thus, the closer the node is to the destination location $L_d$, the lower the base cost. The turning cost increases with an increase in the steering angle $\theta$. In other words, the larger the turn required to reach the node, the greater the cost. If the node is a reverse node that would require the motor vehicle to change gears, an additional reverse cost is added to the node.

Once the nodes have been assigned a cost, the node tree path planner selects the lowest cost node, such as node $a_5$ in the example provided, and generates another set of nodes $b_1, b_2, b_3, b_4 \ldots b_n$ from the selected lowest cost node. Each of the nodes are generated at a distance d from the node $a_5$ at turn angles $\phi$. Any nodes located in areas designated as obstructed by the parking area map are not generated. Moreover, any nodes previously generated are not generated again. Next, costs are assigned to each node $b_1, b_2, b_3, b_4 \ldots b_n$ as described above except that the base cost also includes the cost of node $a_5$. Thus, each child node inherits the cost of the parent node from which it is generated.

In one embodiment, the base cost also includes a generation cost which is a function of which generation the node is from the starting location node. For example, a generation cost may be added after between 20 or 30 generations in order to discourage further generations. In another embodiment, the cost of a child node is compared to a fixed or variable threshold value. If the cost of the child node exceeds the threshold value, the node is not generated or no further child nodes are generated from the node. The tree node path planner then selects the lowest cost node from all of the nodes generated thus far and repeats the method until a newly generated node is at the destination location $L_d$.

Once a node is at the location $L_d$, the node tree path planner traces the path back to the starting location Ls and sets the path 61. The motor vehicle 12 may be driven from node to node along the path or may be driven along an average or weighted curve along the path.

The description of the invention is merely exemplary in nature and variations that do not depart from the gist of the invention are intended to be within the scope of the invention. Such variations are not to be regarded as a departure from the spirit and scope of the invention.

The following is claimed:

1. A method for autonomously parking or un-parking a motor vehicle, the method comprising:
determining a location of the motor vehicle relative to a parking area;
setting a destination location within the parking area;
generating a path comprising the steps of:
(a) generating a first set of nodes from the location of the motor vehicle;
(b) assigning a cost to each node in the first set of nodes;
(c) selecting a lowest cost node from the first set of nodes;
(d) generating another set of nodes from the selected node;
(e) assigning a cost to each of the newly generated nodes;
(f) selecting a lowest cost node from all of the nodes;
(g) repeating steps (d)-(f) until a lowest cost node is located at the destination location; and
(h) setting a path from the location of the motor vehicle to the destination location comprising the last selected lowest cost node and parent nodes connected to the last selected lowest cost node; and
autonomously driving the motor vehicle along the path from the location of the motor vehicle to the destination location.

2. The method of claim 1 wherein generating the first set of nodes includes generating a plurality of nodes each a fixed distance from the location of the motor vehicle and each at a different steering angle.

3. The method of claim 2 wherein generating the another set of nodes includes generating a plurality of nodes each the fixed distance from the selected node of the first set of nodes and each at one of the different steering angles.

4. The method of claim 3 wherein the fixed distance is approximately 2 meters.

5. The method of claim 3 wherein generating the first set of nodes and the another set of nodes includes generating a set of forward nodes in front of the motor vehicle and a set of reverse nodes behind the motor vehicle.

6. The method of claim 5 wherein the set of forward nodes includes a node straight ahead of the motor vehicle, four nodes to the right of the motor vehicle, and four nodes to the left of the motor vehicle.

7. The method of claim 5 wherein assigning a cost to each of the newly generated nodes includes adding a base cost to the cost from the selected node from which the newly generated nodes are generated.

8. The method of claim 7 wherein assigning a cost to each of the newly generated nodes further includes adding a turning cost, wherein a value of the turning cost increases with an increase in the steering angle.

9. The method of claim 8 wherein assigning a cost to each of the newly generated nodes further includes adding a reverse cost if the newly generated node is behind the motor vehicle.

10. The method of claim 9 wherein the base cost of a newly generated node is a function of the distance of the newly generated node from the destination location.

11. The method of claim 1 wherein generating a path further comprises a step of determining whether a newly generated node would be in an obstructed area of the parking map, and wherein any nodes in obstructed areas are not generated.

12. The method of claim 1 wherein generating a path further includes a step of determining whether a newly generated node has been previously generated and wherein any new nodes that have been previously generated are not generated again.

13. The method of claim 1 wherein generating a path further includes the step of comparing the cost of a newly generated node to a threshold value and not generating the node if the cost of the node exceeds the threshold value.

14. A method for autonomously parking or un-parking a motor vehicle, the method comprising:
- locating the motor vehicle within a parking area;
- setting a destination location within the parking area;
- generating a node tree from the location of the motor vehicle to the destination location, wherein the node tree includes a plurality of linked nodes organized into separate generations, each node having a cost associated therewith, wherein the cost of a node is equal to a base cost plus an inherited cost and a turning cost;
- selecting a path from the location of the motor vehicle to the destination location having the lowest cost; and
- autonomously driving the motor vehicle along the path from the location of the motor vehicle to the destination location.

15. The method of claim 14 wherein a generation cost is added to the cost of a node if the generation of the node exceeds a predetermined threshold.

16. The method of claim 15 wherein the turning cost is a function of the steering angle value of the node.

17. The method of claim 16 wherein the inherited cost is equal to the cost of the linked previous generation node.

18. The method of claim 14 wherein a set of coordinates in the parking area are blocked from having nodes generated by the node tree.

19. The method of claim 14 wherein a reverse cost is added to the cost of the node, wherein the reverse cost is a function of the distance to the destination location.

20. A method for autonomously parking or un-parking a motor vehicle, the method comprising:
- locating the motor vehicle relative to a parking area;
- setting a destination location within the parking area;
- generating a path comprising the steps of:
  - (a) generating a first set of nodes from the location of the motor vehicle;
  - (b) assigning a cost to each node in the first set of nodes;
  - (c) selecting a lowest cost node from the first set of nodes;
  - (d) generating another set of nodes linked to the selected node and offset from the selected node by a fixed distance and a steering angle;
  - (e) assigning a cost to each of the newly generated nodes, wherein the cost of a node is equal to a base cost plus an inherited cost from the selected node, a turning cost, and a reverse cost if the newly generated node is behind the selected node;
  - (f) selecting a lowest cost node from all of the nodes;
  - (g) repeating steps (d)-(f) until a lowest cost node is located at the destination location; and
  - (h) setting a path from the location of the motor vehicle to the destination location comprising the last selected lowest cost node and parent nodes connected to the last selected cost node; and
- autonomously driving the motor vehicle along the path from the location of the motor vehicle to the destination location.

* * * * *